US010727876B2

(12) United States Patent
Hornbuckle et al.

(10) Patent No.: US 10,727,876 B2
(45) Date of Patent: Jul. 28, 2020

(54) MULTI-CHANNEL, MULTI-BAND LINEARIZED DIGITAL TRANSCEIVERS

(71) Applicant: JARIET TECHNOLOGIES, INC., Redondo Beach, CA (US)

(72) Inventors: Craig A. Hornbuckle, Rolling Hills Estates, CA (US); Leo Ghazikhanian, Burbank, CA (US)

(73) Assignee: Jariet Technologies, Inc., Redondo Beach, CA (US)

( * ) Notice: Subject to any disclaimer, the term of this patent is extended or adjusted under 35 U.S.C. 154(b) by 27 days.

(21) Appl. No.: 16/085,518

(22) PCT Filed: Mar. 17, 2017

(86) PCT No.: PCT/US2017/023089
§ 371 (c)(1),
(2) Date: Sep. 14, 2018

(87) PCT Pub. No.: WO2017/161347
PCT Pub. Date: Sep. 21, 2017

(65) Prior Publication Data
US 2019/0097662 A1 Mar. 28, 2019

Related U.S. Application Data

(60) Provisional application No. 62/310,579, filed on Mar. 18, 2016.

(51) Int. Cl.
*H04B 1/00* (2006.01)
*H04L 27/00* (2006.01)
(Continued)

(52) U.S. Cl.
CPC ......... *H04B 1/0014* (2013.01); *H04B 1/0057* (2013.01); *H04B 1/0475* (2013.01);
(Continued)

(58) Field of Classification Search
CPC .. H04B 1/0014; H04B 1/0057; H04B 1/0475; H04B 1/0483; H04B 1/10; H04B 1/16;
(Continued)

(56) References Cited

U.S. PATENT DOCUMENTS 6,121,910 A * 9/2000 Khoury .................. H03M 3/41
341/143
8,674,867 B1 * 3/2014 Klepser .................. H01F 21/12
341/144

(Continued)

FOREIGN PATENT DOCUMENTS

EP 2530832 12/2012
EP 2641371 9/2013

OTHER PUBLICATIONS

International Preliminary Report on Patentability from PCT/US2017/023089, dated Sep. 27, 2018, 15 pages.

(Continued)

*Primary Examiner* — Kevin D Mew
(74) *Attorney, Agent, or Firm* — Morgan, Lewis & Bockius LLP (57) ABSTRACT

A multi-channel, multi-band system for wireless communication includes a radio frequency (RF) front end, a mixed-signal front end for converting an incoming analog RF signal into an incoming digital RF signal and converting a composite outgoing digital RF signal into an outgoing analog RF signal, a summation circuit for combining multiple outgoing digital RF signals to the composite outgoing digital RF signal, and multi-band transceivers. Each of the multi-band transceivers may process the incoming digital RF signal to provide an incoming baseband signal and process an outgoing baseband signal to provide an outgoing digital RF signal. The mixed-signal front end may apply a loading control to each transceiver for adjusting an amount of loading on the transmit path from the transceiver to the (Continued)

mixed-signal front-end. The transceivers may individually conduct a feedback calibration on the receive path to optimize the incoming baseband signal for each band.

18 Claims, 5 Drawing Sheets

(51) Int. Cl.
*H04B 10/00* (2013.01)
*H04B 10/69* (2013.01)
*H04B 1/16* (2006.01)
*H04B 1/10* (2006.01)
*H04B 1/04* (2006.01)

(52) U.S. Cl.
CPC ............ *H04B 1/0483* (2013.01); *H04B 1/10* (2013.01); *H04B 1/16* (2013.01); *H04B 10/00* (2013.01); *H04B 10/69* (2013.01); *H04L 27/0002* (2013.01); *H04B 2001/0408* (2013.01); *H04B 2001/0425* (2013.01); *H04B 2001/0433* (2013.01)

(58) Field of Classification Search
CPC .................................................. H04B 10/00; H04B 10/69; H04B 2001/0408; H04B 2001/0425; H04B 2001/0433; H04L 27/0002
See application file for complete search history.

(56) References Cited

U.S. PATENT DOCUMENTS

| | | | |
|---|---|---|---|
| 9,020,011 B1 | 4/2015 | Hiebert et al. | |
| 10,270,510 B1* | 4/2019 | Wang | H04B 1/00 |
| 2006/0063490 A1* | 3/2006 | Bader | H04B 1/0483 |
| | | | 455/45 |
| 2010/0022206 A1* | 1/2010 | Aparin | H03F 3/24 |
| | | | 455/114.2 |
| 2010/0119008 A1 | 5/2010 | Pal | |
| 2010/0177811 A1 | 7/2010 | Duerdodt et al. | |
| 2012/0064847 A1* | 3/2012 | Xu | H04B 1/0475 |
| | | | 455/114.3 |
| 2013/0004180 A1 | 1/2013 | Gupta et al. | |
| 2013/0208826 A1* | 8/2013 | Asuri | H04B 1/0475 |
| | | | 375/296 |
| 2013/0266092 A1 | 10/2013 | Sugar et al. | |
| 2014/0028391 A1* | 1/2014 | Morris | H03F 3/68 |
| | | | 330/147 |
| 2014/0269972 A1* | 9/2014 | Rada | H04B 1/3838 |
| | | | 375/285 |
| 2016/0099732 A1* | 4/2016 | Petrovic | H04B 1/0475 |
| | | | 375/297 |
| 2016/0285553 A1* | 9/2016 | Cho | H04B 10/25759 |
| 2017/0208622 A1* | 7/2017 | Mizrahi | H04W 74/002 |
| 2017/0347305 A1* | 11/2017 | Abraha | H04B 1/02 |

OTHER PUBLICATIONS

Extended European Search Report from European Patent Application No. 17767681.4, dated Oct. 15, 2019, 8 pages.

* cited by examiner

MULTI-CHANNEL, MULTI-BAND LINEARIZED DIGITAL TRANSCEIVERS

TECHNICAL FIELD

The present description relates in general to transceivers, and more particularly to, for example, without limitation, multi-channel, multi-band linearized digital transceivers.

BACKGROUND

Transceivers may include mixers, filters and amplifiers between a low-noise amplifier and an analog-to-digital converter, and between a digital-to-analog converter and a power amplifier. In this respect, the transceivers perform frequency conversion and filtering operations in the analog domain and conversions to/from the digital domain at baseband frequencies.

The description provided in the background section should not be assumed to be prior art merely because it is mentioned in or associated with the background section. The background section may include information that describes one or more aspects of the subject technology.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Figure 1:
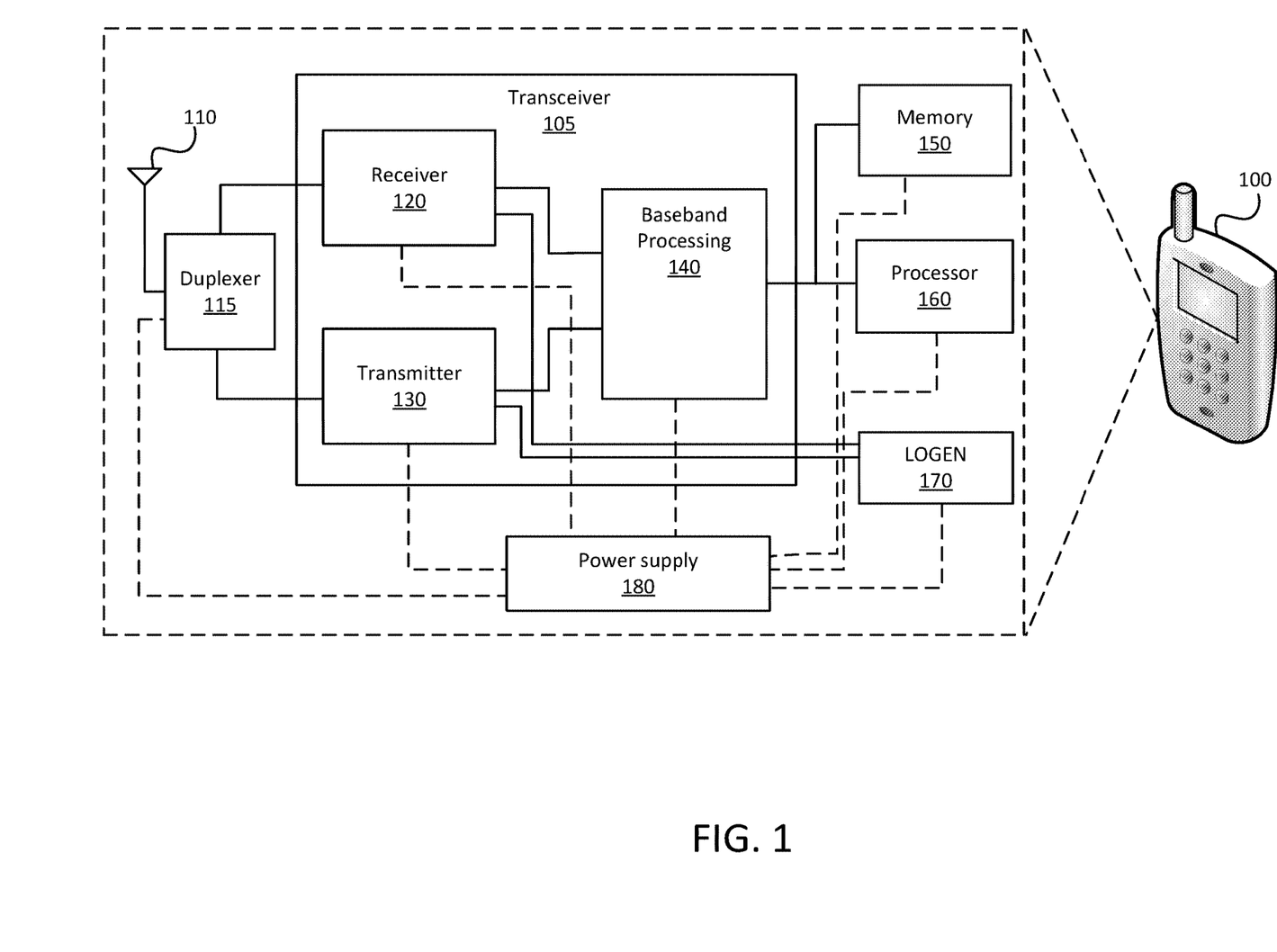
FIG. 1 illustrates an example electronic system.

FIG. 1 illustrates an example wireless communication device 100 in accordance with one or more implementations of the subject technology. The wireless communication device 100 includes a radio frequency (RF) antenna 110, a duplexer circuit 115, a transceiver circuit 105, a memory 150, a processor 160, a local oscillator generator (LOGEN) 170, and a power supply circuit 180. The transceiver circuit 105 includes a receiver circuit 120, a transmitter circuit 130, and a baseband processing circuit 140. In various embodiments of the subject technology, one or more of the blocks represented in FIG. 1 may be integrated on one or more semiconductor substrates. For example, the blocks 120-170 may be realized in a single chip or a single system on chip, or may be realized in a multi-chip chipset. In various implementations, one or more blocks may be added. In various implementations, one or more blocks shown may be removed or replaced with other one or more blocks.

The RF antenna 110 may be suitable for transmitting and/or receiving RF signals (e.g., wireless signals) over a wide range of frequencies (e.g., 20 GHz-44 GHz, 20 GHz-86 GHz, 86 GHz-98 GHz). Although a single RF antenna 110 is illustrated, the subject technology is not so limited.

The duplexer circuit 115 may provide isolation in the transmit band to avoid saturation of the receiver circuit 120 or damaging parts of the receiver circuit 120, and to relax one or more design requirements of the receiver circuit 120. Furthermore, the duplexer circuit 115 may attenuate noise in the receive band. The duplexer circuit 115 may be operable in multiple frequency bands of various standards (e.g., wireless standards, cellular standards). The duplexer circuit 115 may consist of a transmit/receive (T/R) switch, which is used to select either Receive or Transmit modes for the wireless communication device 100. The T/R switch may be controlled by the baseband processing circuit 140.

The receiver circuit 120 may include suitable logic circuitry and/or code that may be operable to receive and process incoming RF signals from the RF antenna 110. The receiver circuit 120 may, for example, be operable to amplify and/or down-convert received wireless signals. In various embodiments of the subject technology, the receiver circuit 120 may be operable to cancel noise in received signals and may be linear over a wide range of frequencies. In this manner, the receiver circuit 120 may be suitable for receiving signals in accordance with a variety of wireless standards. By way of non-limiting example, such standards may include Wi-Fi, WiMAX, Bluetooth, GSM, LTE and 3G.

The transmitter circuit 130 may include suitable logic circuitry and/or code that may be operable to process and transmit signals from the RF antenna 110. The transmitter circuit 130 may, for example, be operable to up-convert baseband processing signals to outgoing RF signals and amplify the outgoing RF signals. In various embodiments of the subject technology, the transmitter circuit 130 may be operable to up-convert and amplify baseband signals processed in accordance with a variety of wireless standards. By way of non-limiting example, such standards may include Wi-Fi, WiMAX, Bluetooth, GSM, LTE and 3G. In various embodiments of the subject technology, the transmitter 130 may be operable to provide signals for further amplification by one or more power amplifiers. In one or more implementations, the transmitter 130 includes a power amplifier (PA) for amplifying the outgoing RF signals.

The baseband processing circuit 140 may include suitable logic, circuitry, interfaces, and/or code that may be operable to perform processing of baseband signals. The baseband processing circuit 140 may, for example, analyze received signals and generate control and/or feedback signals for configuring various components of the wireless communication device 100 such as the receiver circuit 120. The baseband processing circuit 140 may be operable to encode, decode, transcode, modulate, demodulate, encrypt, decrypt, scramble, descramble, and/or otherwise process data in accordance with one or more wireless standards.

The memory 150 may include suitable logic, circuitry, and/or code that may enable storage of various types of information such as received data, generated data, code, and/or configuration information. The memory 150 may include, for example, RAM, ROM, flash, and/or magnetic storage. In various embodiment of the subject technology, information stored in the memory 150 may be utilized for configuring the receiver circuit 120 and/or the baseband processing circuit 140.

The processor 160 may include suitable logic, circuitry, and/or code that may enable processing data and/or controlling operations of the wireless communication device 100. In this regard, the processor 160 may be enabled to provide control signals to various other portions of the wireless communication device 100. The processor 160 may also control transfers of data between various portions of the wireless communication device 100. Additionally, the processor 160 may enable implementation of an operating system or otherwise execute code to manage operations of the wireless communication device 100.

The local oscillator generator (LOGEN) 170 may include suitable logic, circuitry, interfaces, and/or code that may be operable to generate one or more oscillating signals of one or more frequencies. The LOGEN 170 may be operable to generate digital and/or analog signals. In this manner, the LOGEN 170 may be operable to generate one or more clock signals and/or sinusoidal signals. Characteristics of the oscillating signals such as the frequency and duty cycle may be determined based on one or more control signals from, for example, the processor 160 and/or the baseband processing circuit 140. In one or more implementations, the LOGEN 170 may employ the high performance complementary metal-oxide semiconductor (CMOS) oscillator (e.g., a voltage-controlled oscillator) to generate the clock signals and/or sinusoidal signals.

The power supply 180 may include suitable logic, circuitry, and/or code that may be operable to supply power (e.g., regulated voltages) to components within the wireless communication device 100. For example, the power supply 180 can supply power to the duplexer 115, the receiver 120, the transmitter 130, the baseband processing circuit 140, the memory 150, the processor 160, and the LOGEN 170.

In operation, the processor 160 may configure the various components of the wireless communication device 100 based on a standard according to which the wireless communication device 100 receives signals. Wireless signals may be received via the RF antenna 110 and amplified and down-converted by the receiver circuit 120. The baseband processing circuit 140 may perform noise estimation and/or noise cancellation, decoding, and/or demodulation of baseband signals. In this manner, information in the received signal may be recovered and utilized appropriately. For example, the information may be audio, text, images, video, multimedia and/or control signals to be presented to a user of the wireless communication device 100, data to be stored to the memory 150, and/or information affecting and/or enabling operation of the wireless communication device 100. The baseband processing circuit 140 may modulate, encode, and perform other processing on be audio, text, images, video, multimedia and/or control signals to be transmitted by the transmitter circuit 130 in accordance with various standards. The power supply 180 may provide one or multiple regulated rail voltages (e.g., $V_{DD}$) for various components of the wireless communication device 100.

Figure 2:
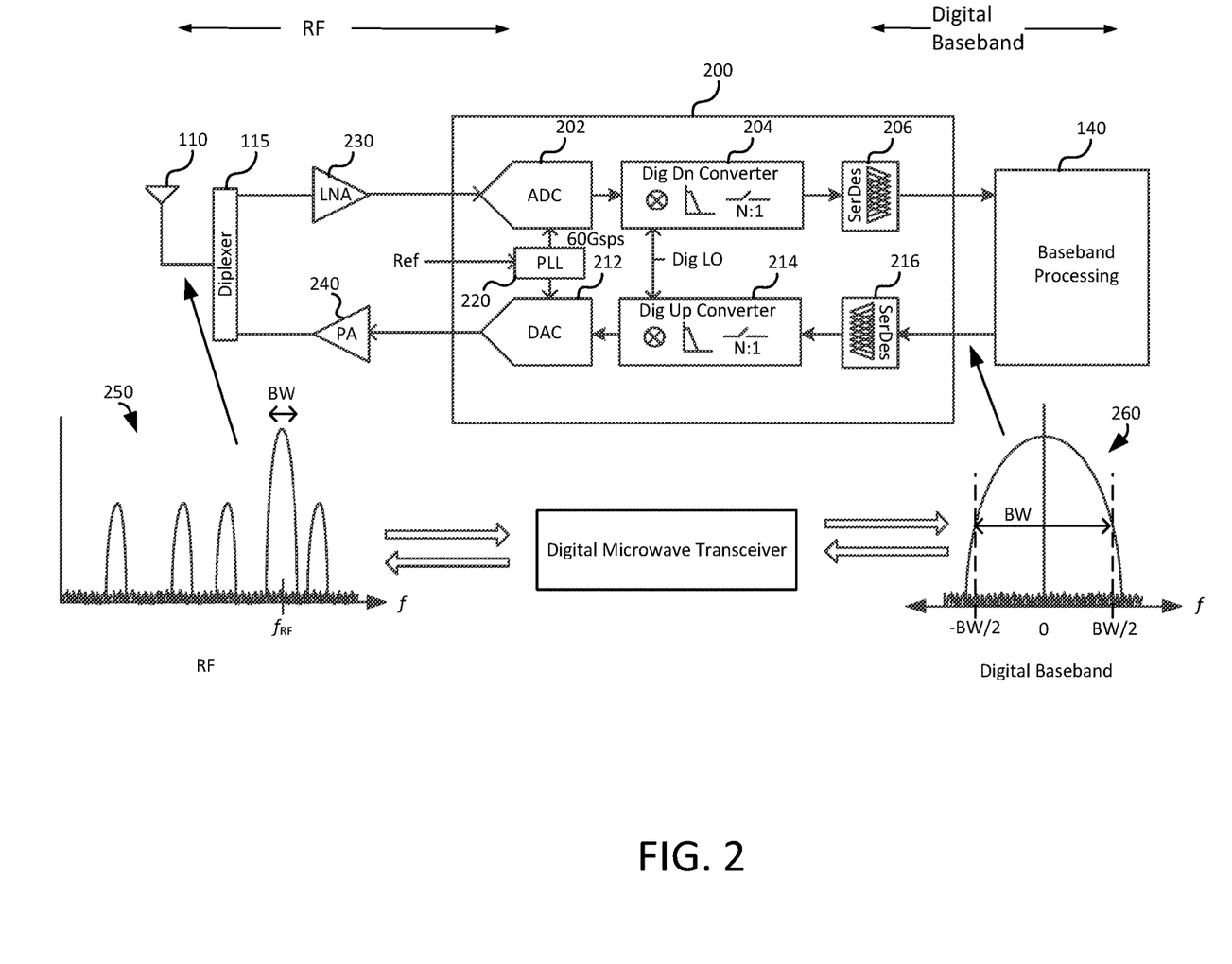
FIG. 2 illustrates a schematic diagram of an example architecture of a digital transceiver circuit connected to an antenna circuit and a baseband processing circuit.

FIG. 2 illustrates an example of a digital transceiver circuit 200 connected to an antenna element (e.g., 110) via amplifiers on one end and to a baseband processing circuit (e.g., 140) on another end. The digital transceiver circuit 200 includes an analog-to-digital converter (ADC) 202, a digital-to-analog converter (DAC) 212, a phase-locked loop (PLL) 220, a digital downconverter (Dig Dn Converter) 204, a digital upconverter (Dig Up Converter) 214, and serializer/deserializer (SerDes) (e.g., 206, 216). The PLL 220 may generate clock signals and provide them to the ADC 202 and DAC 212. The PLL 220 may receive a reference clock signal(s), represented as Ref, from which to generate the clock signals for the ADC 202 and DAC 212. In an aspect, a clock rate of the PLL 220 may be 60 giga samples per second (Gsps). A local oscillator, represented as Dig LO, may be provided to the digital downconverter 204 and the digital upconverter 214 to change a frequency of a signal (e.g., from RF to baseband, from baseband to RF). In one or more implementations, the Dig LO is generated by one or more numerically controlled oscillators (NCOs).

The digital transceiver circuit 200 may include a transmit path (e.g., radio frequency (RF) transmit path) and a receive path (e.g., RF receive path). In an aspect, the transmit path may be utilized to transmit outgoing RF signals and the receiver path may be utilized to receive incoming RF signals. As shown in FIG. 2, a signal 250, 260) of bandwidth BW may be received by and/or transmitted from the digital transceiver circuit. In particular, the frequency spectrum 250 illustrates a center frequency (e.g., $\|_{RF}$) with a bandwidth (BW) in a range of about 10 megahertz (MHz) to about 1 gigahertz (GHz) depending on implementation. The bandwidth may be in a range of 100 MHz to 500 MHz in some embodiments, and in a range of 500 MHz to 1 GHz in other embodiments. Bandwidths as high as 30 GHz may be used in still other embodiments. In an aspect, the digital transceiver circuit 200 may facilitate communication of signals with frequencies center frequencies) in the range of 300 megahertz (MHz) to 300 gigahertz (GHz). The digital transceiver circuit 200 may also facilitate communication of signals with other frequencies (e.g., 10 MHz-300 MHz, and above 300 GHz).

The transmit path of the digital transceiver circuit 200 may include the SerDes 216, the digital upconverter circuit 214, and the DAC 212. The SerDes 216 may receive a baseband signal (e.g., digital baseband signal) from the baseband processing circuit 140. In an aspect, the signal 260 received from the baseband processing circuit 140 may have a bandwidth BW (e.g., 100 MHz). The SerDes 216 may process the baseband signal and provide the processed baseband signal to the digital upconverter circuit 214. The digital upconverter circuit 214 may upconvert the processed baseband signal and provide the upconverted signal to the DAC 212. The DAC 212 may convert the upconverted signal to an analog signal (e.g., an outgoing RF signal) and provide the analog signal to the antenna element 110 for transmission. In an aspect, the analog signal output from the DAC 212 may be amplified by the PA 240 and provided to the diplexer 115. The diplexer 115 may couple the amplified analog signal to the antenna element 110.

The receive path of the digital transceiver circuit 200 may include the ADC 202, the digital downconverter circuit 204, and the SerDes 206. The ADC 202 may receive an amplified analog signal (e.g., RF signal). The amplified analog signal may be an analog signal that has been amplified by an amplifier. In an aspect, the ADC 202 may receive the amplified analog signal from a low-noise amplifier (LNA) 230 coupled to the antenna element 110 via the diplexer 115. The ADC 202 may convert (e.g., digitize) the amplified analog signal and provide the resulting digital signal to the digital downconverter circuit 204. The digital downconverter circuit 204 may downconvert the digital signal to a baseband signal (e.g., down to a baseband frequency) and provide the baseband signal to the SerDes 206. The SerDes 206 may process the baseband signal and provide the processed baseband signal to the baseband processing circuit 140 for processing.

In some aspects, the digital transceiver circuit 200 may be formed of a digital transceiver front-end subsystem and a digital transceiver backend subsystem. The digital transceiver front end may be referred to as a mixed-signal front-end subsystem or an RF and mixed-signal front-end subsystem. The digital transceiver front end may provide digital interfaces to the digital transceiver backend. In an aspect, the digital transceiver backend may be fully digital. With reference to FIG. 2, the digital transceiver front-end subsystem may include the ADC 202 and the DAC 212. The digital transceiver backend may include the digital downconverter circuit 204, the digital upconverter circuit 214, and the SerDes (e.g., 206, 216).

In some aspects, multiple antenna elements (not shown) may be utilized in place of the diplexer 115 and the single antenna element 110 shown in FIG. 2. The multiple antenna elements may facilitate beamforming. In an aspect, to facilitate beamforming, additional RF components (e.g., additional PAs, LNAs, phase shifters, and/or weighting elements) may be utilized.

In some aspects, the ADC 202 and DAC 212 may be millimeter wave ADCs and DACs, respectively. In such aspects, the digital transceiver circuit 200 may be referred to as a digital microwave transceiver.

In some aspects, the subject technology allows replacement of traditional analog (e.g., RF) systems with millimeter wave ADCs and DACs to perform frequency conversion and/or filtering operations in the digital domain. In some aspects, processing in the digital domain may be associated with lower cost (e.g., monetary cost, power cost), smaller area, lower distortion, better group delay characteristics, etc. than corresponding processing in the analog domain.

In some aspects, the digital transceiver circuit 200 facilitates direct RF sampling and synthesis. In an aspect, the digital transceiver circuit 200 may allow direct sampling of signals of various frequencies, such as microwave frequencies (e.g., between 300 MHz and 300 GHz) and ultra-high frequency (UHF). In an aspect, the digital transceiver circuit 200 may allow a direct sampling of a microwave signal, or sampling at a high microwave intermediary frequency.

In an aspect, the direct RF sampling and synthesis may allow providing of a higher available RF bandwidth as the data converters operate with millimeter wave sampling clocks. The operation at millimeter wave sampling clocks may allow for larger Nyquist zones, which may allow for relatively large bandwidth (e.g., instantaneous bandwidth) and oversampling rate (OSR) gain. In such an aspect, the accessible spectrum may be maximized and/or concurrent multi-spectral processing may be enabled and/or facilitated.

In another aspect, the direct RF sampling and synthesis may allow providing of larger processed bandwidth. In this regard, one or more of the following may be provided: data rate may be maximized, latency may be minimized, channel count may be maximized, etc. In an aspect, the direct RF sampling and synthesis may allow a reduction of size and/or complexity of a system by moving RF synthesizer(s), mixer(s), and/or filter(s) into standard digital logic. In an aspect, the RF synthesizer(s), mixer(s), and/or filter(s) may be associated with higher cost and/or lower performance as opposed to performing their functions in the digital domain.

In an aspect, the direct RF sampling and synthesis may allow providing of flexibility. The flexibility may be utilized for multiband systems and multi-standard systems, such as for base station applications. The flexibility may allow utilization of ADCs and DACs not tailored to a particular waveform or application.

In some aspects, the direct RF sampling and synthesis may be utilized for digital phased array systems. In an aspect, the direct RF sampling and synthesis may bring analog-to-digital (A/D) and digital-to-analog (D/A) conversions closer to each radiating element (e.g., the antenna element 110) leading to low analog content in the signal path. In this aspect, the proximity of A/D and D/A conversions to the radiant elements may allow phase and amplitude stability across wide frequency bands and/or may enable infrequent calibration and high accuracy. For example, in FIG. 2, the ADC 202 is coupled to the LNA 230 and the DAC 212 is coupled to the PA 240, with few or no intervening components. In contrast, traditional systems may include one or more mixers, one or more filters, and/or one or more amplifiers between the LNA 230 and the ADC 202, and between the DAC 212 and PA 240. The additional components may cause the ADC 202 and the DAC 212 to be farther from the antenna element 110.

Figure 3:
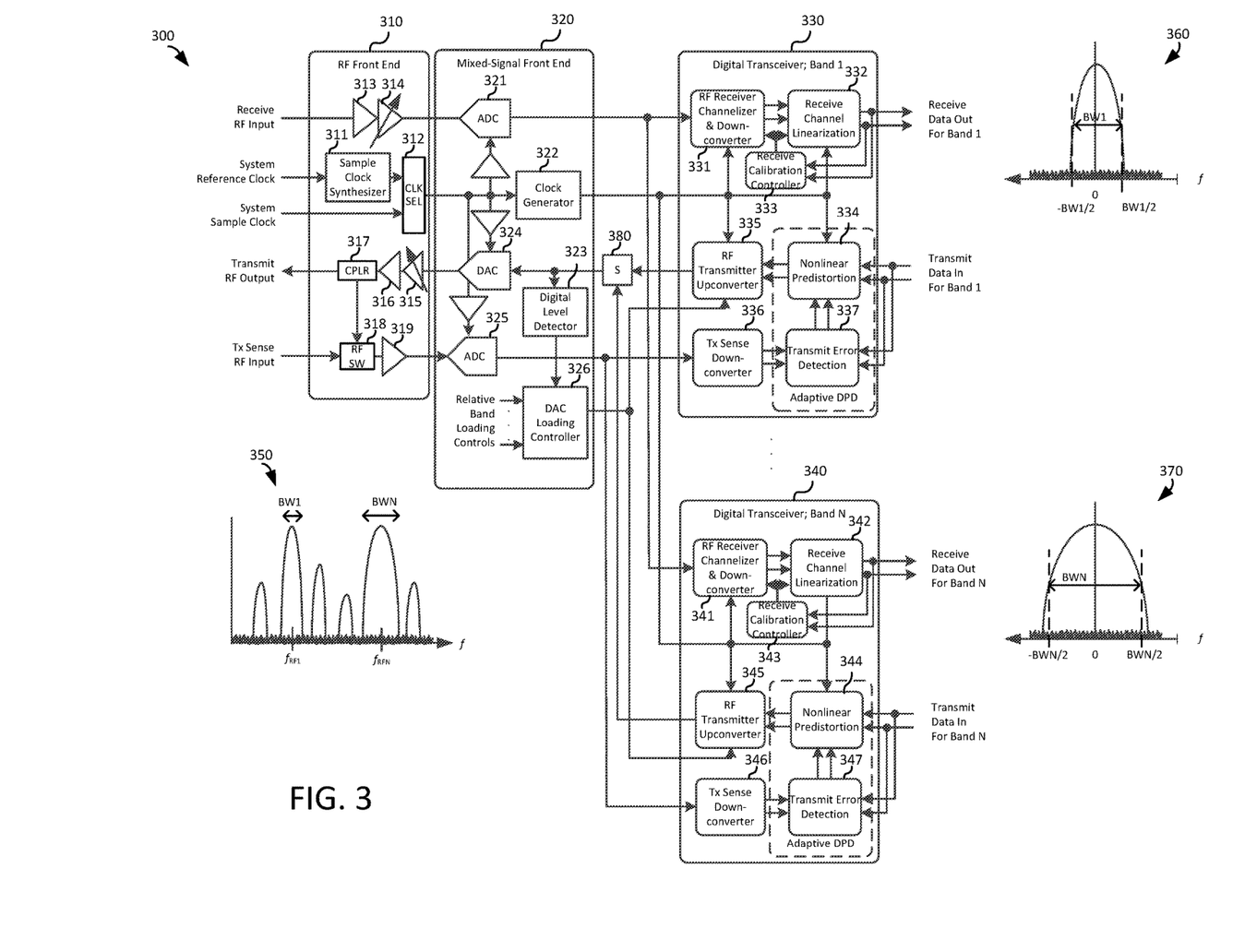
FIG. 3 illustrates an example of a multi-channel, multi-band linearized digital transceiver circuit.

FIG. 3 illustrates an example of a multi-channel, multi-band linearized digital transceiver circuit 300. The multi-channel, multi-band linearized digital transceiver circuit 300 facilitates direct RF sampling and synthesis. In an aspect, the term multi-channel may be referred to as multiple frequency bands or multiple bands. A multi-channel, multi-band linearized digital transceiver circuit may be referred to as a multi-band linearized digital transceiver circuit.

The multi-band linearized digital transceiver circuit 300 may be formed of a digital transceiver front-end subsystem and a digital transceiver backend subsystem. In particular, the multi-band linearized digital transceiver circuit 300 includes an RF front end 310 and a mixed-signal front end 320 that form the digital transceiver front-end subsystem, and includes multiple digital transceiver units (e.g., 330, 340) that form the digital transceiver backend subsystem.

The RF front end 310 includes a sample clock synthesizer 311, a clock selector circuit 312, a LNA 313, variable gain attenuators 314 and 315, a power amplifier 316, a coupler 317, an RF switch module 318, and a feedback driver 319. The mixed-signal front end 320 includes an ADC 321, a clock generator 322, a digital level detector 323, a DAC 324, an ADC 325, and a DAC loading controller 326.

Each digital transceiver unit in the digital transceiver backend may be associated with a different band (e.g., Band 1, Band N). Band 1 and Band N may be associated with RF signals of bandwidth BW1 and BWN, respectively. In an aspect, one or more of the bands may overlap in frequency. Each digital transceiver unit may be, may include, or may be a part of, the digital transceiver backend shown in FIG. 3. The digital transceiver front end may be shared by the digital transceiver units in the digital transceiver backend.

The digital transceiver unit 330 includes an RF receiver channelizer and down-converter circuit 331, a receive channel linearization circuit 332, a receive calibration controller 333, an RF transmitter upconverter 335 and a transmission (Tx) sense down-converter 336. The digital transceiver unit 330 also includes an adaptive digital pre-distortion module that includes a nonlinear predistortion circuit 334 and a transmit error detection circuit 337. The digital transceiver unit 340 includes an RF receiver channelizer and down-converter circuit 341, a receive channel linearization circuit 342, a receive calibration controller 343, an RF transmitter upconverter 345 and a transmission (Tx) sense down-converter 346. The digital transceiver unit 340 also includes an adaptive digital pre-distortion module that includes a nonlinear predistortion circuit 344 and a transmit error detection circuit 347.

The RF front end 310 is configured to receive an incoming analog RF signal on a receive path via the Receive RF input port, and configured to transmit an outgoing analog RF signal on a transmit path via a transmit RF output port. In an aspect, the signal 350 received at the Receive RF Input port or transmitted at the Transmit RF Output port may have a bandwidth BW1 corresponding to a first sub-band (or unction $f_{RF1}$) and a bandwidth BWN corresponding to a sub-band N (or $f_{RFN}$), where N sub-bands may coexist in the RF signal. The mixed-signal front end 320 is coupled to the RF front end 310, and the mixed-signal front end 320 is configured to convert the incoming analog RF signal from the RF front end 310 into an incoming digital RF signal and configured to convert an outgoing digital RF signal into the outgoing analog RF signal. The digital transceiver units 330, 340 are individually coupled to the mixed-signal front end 320, and each digital transceiver unit is configured to process the incoming digital RF signal along the receive path to provide an incoming baseband processing signal for a baseband processor (e.g., 140) for processing and configured to process an outgoing baseband processing signal to provide the outgoing digital RF signal on a respective transmit path to the mixed-signal front end 320. In an aspect, the signal 360 transmitted at the Receive Data Out port for Band 1 or received at the Transmit Data In port for Band 1 may have a bandwidth BW1 corresponding to a first sub-band (or $f_{RF1}$), and the signal 370 transmitted at the Receive Data Out port fir Band N or received at the Transmit Data In port for Band N may have a bandwidth BWN corresponding to a sub-band N (or $f_{RFN}$). In one or more implementations, each digital transceiver unit has a respective transmit path to the mixed-signal front end 320 and a shared receive path with other digital transceiver units from the mixed-signal front end 320. In one aspect, an analog RF signal includes an analog signal(s) at a radio frequency(ies) (e.g., center frequencies in the range between 300 MHz and 300 GHz). In one aspect, a digital RF signal includes a digital signal(s) (e.g., square waves) at a radio frequency(ies). In one aspect, a baseband processing signal includes a digital signal(s) at a baseband(s) (e.g., basebands having frequencies lower than the radio frequencies, such as, e.g., 0 to 300 MHz).

In FIG. 3, the sample clock synthesizer 311 is configured to receive a system reference clock and feeds a synthesized clock output to one of the inputs to the clock selector circuit 312. The system sample clock is fed to the other input to the clock selector circuit 312, where one of the two system clocks is selected using a selection control signal that is input to the clock selector circuit 312. In this respect, the selection control signal may be a binary signal. In some implementations, the selection control signal may be a hardwired signal or an externally-controlled signal from a host system based on a mode of the host system. The clock selector circuit 312 then provides the selected system clock to the mixed-signal front end 312. The clock signals may be provided by the clock selector circuit 312 to the RF receiver channelizer and downconverter circuit 331, the receive channel linearization circuit 332, the RF transmitter upconverter circuit 335, and/or the nonlinear predistortion circuit 334. The system sample clock may be provided (e.g., buffered) to the ADCs (e.g., 321, 325) and the DAC 324 in the mixed-signal front end 320. In one or more implementations, the sample rate of the system sample clock is about 32 Gsps, where a sample may be taken on both rise and fall edges of the system sample clock to effectively generate a fanout sample rate of about 64 Gsps. The system sample clock may be configured to run at full rate (e.g., 1 GHz), at half rate (e.g., 500 MHz), or at quarter rate (e.g., 250 MHz) depending on implementation. The system reference clock may be sourced by an external clock source such as an off-chip PLL or an external pulse generator.

The RF front end 310 may include a Receive RF Input port, a Transmit RF Output port, and a Tx Sense RF Input port. The RF front end 310 includes a first variable gain attenuator (e.g., 314) on the receive path and a second variable gain attenuator (e.g., 315) on the transmit path. The RF front end 310 also includes the LNA 313 coupled directly in series with the first variable gain attenuator (e.g., 314) on the receive path, where the incoming analog RF signal is received by the LNA 313 during operation. In some aspects, the variable gain attenuators 314 and 315 may each include a voltage-controlled attenuator and a gain amplifier with respective settings. The RF front end 310 also includes the PA 316 directly coupled in series with the second variable gain attenuator (e.g., 315) on the transmit path, where the outgoing analog RF signal is driven by the PA 316.

The mixed-signal front end 320 includes the ADC 321 coupled to the Receive RF Input via the LNA 313 and the variable gain attenuator 314 in the RF front end 310. In an aspect, the antenna element 110 may be coupled to the ADC 321 via a Receive RF Input port of the RF front end 310. The mixed-signal front end 320 includes the DAC 324 coupled to the Transmit RF Output via the variable gain attenuator 315 and the PA 316, and further via the coupler 317 (CPLR). The mixed-signal front end 310 also includes the ADC 325 coupled to the Tx Sense RF Input via the RF switch module 318 (RF SW) and one or more amplifiers (e.g., fixed amplifier(s), tunable amplifier(s)) such as the feedback driver 319.

The mixed-signal front end 320 also includes a clock generator circuit 322. The clock generator circuit 322 is directly coupled to the output of the clock selector circuit 312, and is configured to receive the selected system clock from the clock selector circuit 312. The clock generator circuit 322 may be a frequency divider such that the system sample clock may be divided by half to provide a fanout system clock to the digital transceiver units at half-rate (e.g., 500 MHz where the system sample clock is 1 GHz). The clock generator circuit 322 may also be a collection of dividers so that different clock frequencies are applied to, for example, the RF receiver channelizer and downconverter circuit 331, the receive channel linearization circuit 332, the receive calibration controller 333, the nonlinear predistortion circuit 334, and the RF transmitter upconverter circuit 335.

The digital transceiver units (e.g., 330, 340) respectively include a Receive Data Out for Band 1 port and Transmit Data. In for Band 1, and a Receive Data Out for Band N port and Transmit Data In for Band N. In this respect, the input in-phase quadrature signals from the baseband processing circuit 140 are received through the Transmit Data In for Band 1 ports, and the output in-quadrature signals to the baseband processing circuit 140 are provided through the Receive Data Out for Band 1 ports, for example. The digital transceiver backend subsystem may include a subsystem for each of the different frequency bands (e.g., Band 1, Band 2, . . . , Band N). In some aspects, the digital transceiver backend may include circuitry for performing frequency conversion (translation) to and from a particular frequency, band of interest. In some aspects, the digital transceiver backend may tune the selected frequency band down to baseband in-phase quadrature (I-Q) (digital). The digital transceiver backend may perform frequency conversion to and from a set of selectable (programmable) frequency bands of interest. By way of non-limiting example, parameters that are programmable may include receive center tune frequencies, receive bandwidths, receive gains (digital gains) for each band, transmit center tune frequencies, transmit bandwidths, and transmit gains (digital gains). The receive digital subsystem of the digital transceiver backend for each band may include channel linearizers (e.g., 332) and/or linear equalizers. In an aspect, the linearizer subsystem may be tailored to each band of interest. The transmit digital subsystem of the digital transceiver backend for each band may include predistortion linearizers (e.g., 334) and/or linear equalizers. In an aspect, the predistortion subsystem may be tailored to each band of interest. The transmit digital subsystem for each band may also include a respective transmit sense function. In an aspect, the transmit sense (e.g., 336), error detection e.g., 337), and predistortion subsystem (e.g., 334) may be tailored to each band of interest.

In some aspects, the multi-band linearized digital transceiver circuit 300 may allow concurrent multiband operation using the same common digital transceiver front end (e.g., 310, 320). The ADC 321 of the receive path may be coupled to the RF receiver channelizer and downconverter circuit in each of the digital transceiver units (e.g., 331, 341). The ADC 325 of the transmit sense path may be coupled to the Tx sense downconverter circuit in each of the digital transceiver units (e.g., 336, 346). In the transmit path, a summation circuit 380 may be utilized to couple the digital transceiver front end (e.g., 320) to the digital transceiver backend (e.g., 330). The summation circuit 380 may be utilized to combine signals from the digital transceiver units (e.g., 330, 340) to be converted to the analog domain and provided to the Transmit RF Output port of the digital transceiver front end (e.g., 310).

In one or more implementations, the ADC 321 is configured to convert the incoming analog RF signal into the incoming digital RF signal on the receive path. The ADC 321 receives a buffered clock signal from the clock generator circuit in the RF front end 320. The ADC 321 drives the incoming digital RF signal to the RF receiver channelizer and down-converter circuit of each digital transceiver unit (e.g., 331, 341). In this respect, the same samples from the incoming digital RF signal are driven to each digital transceiver unit but the incoming digital RF signal is tuned to different frequencies of the samples at each digital transceiver unit.

In some aspects, each of the digital transceiver units includes a receive digital subsystem. The receive digital subsystem may include linearizers (e.g., receive channel linearization 332) to correct for receiver path nonlinearities, such as third order intermodulation distortion, and/or linear equalizers to correct for the effects of reflections and linear frequency response in the entire receive path from the antenna element 110 up to and including the ADC 321 of the receive path.

In the multi-band linearized digital transceiver circuit 300, each of the digital transceiver units (e.g., 330, 340) is configured to perform receiver signal calibration on the incoming baseband processing signal (e.g., downconverted signal to the baseband processing circuit 140) as feedback and may adjust the incoming baseband processing signal based on the receiver signal calibration. For example, the incoming baseband processing signal at a node to the Receive Data Out port is fed back and calibrated to determine any adjustments that are required to achieve the expected signal characteristics in the baseband signal. The receive calibration controller of each digital transceiver unit (e.g., 333, 343) is configured to calibrate for a corresponding band of interest, such that the digital transceiver units are calibrated separately for each band. The calibration performed by the receive calibration controller may be performed in a background mode or a foreground mode depending on implementation. In some aspects, each of the receive calibration controllers (e.g., 333, 343) may run under a central schedule such that the calibration is run in sequence across the digital transceiver units. In other aspects, the receive calibration controllers run on an independent schedule, and may operate concurrently with one or more other receive calibration controllers. The calibration performed on a band-by-band basis may include calibration for interleave offset, interleave gain, harmonic distortion suppression, and other related receiver calibration techniques. The receive calibration controller 333, 343) may feed the calibration back to the RF receiver channelizer and downconverter circuit (e.g., 331, 341, respectively) and the receive channel linearization circuit (e.g., 332, 342, respectively) so that the output signal at the Receive Data Out for each band can be optimized.

In some aspects, each of the digital transceiver units includes a transmit digital subsystem. The transmit digital subsystem may include an adaptive digital predistortion module composed of predistortion linearizers (e.g., 334) to correct for transmit path nonlinearities, such as third order intermodulation distortion, and/or linear equalizers to correct for the effects of reflections and linear frequency response in the entire transmit path from the DAC 324 up to the antenna element 110, including the DAC circuitry itself. In an aspect, the DAC 324 may be coupled to the antenna element 110 via the Transmit RF Output port of the RF front end 310. In a first instance, the input in-phase quadrature signals are fed through the Transmit Data Out ports and provided through the nonlinear predistortion circuit 334 as a feedforward correction given that there is no prior feedback. In subsequent instances, the in-phase quadrature signals fed through the nonlinear predistortion circuit 334 are adjusted based on feedback received from the transmit error detection circuit 337.

The predistorted baseband signals from the nonlinear predistortion circuit 334 are then fed through the RF transmitter upconverter to convert the predistorted baseband signals from the baseband frequency to the RF frequency. In this respect, the RF transmitter upconverter 335 provides outgoing digital RF signals, which are then fed to a summation circuit 380. In some aspects, the RF transmitter upconverter circuit 335 receives signaling from the LOGEN 170.

In FIG. 3, the multi-band linearized digital transceiver circuit 300 includes the summation circuit 380, where the outgoing digital RF signals from the digital transceiver units (e.g., 330, 334) are summed (or combined) together onto a common channel (or transmission path). The summation circuit 380 is thus configured to combine multiple outgoing digital RF signals from the digital transceiver units into a composite digital RF signal. The mixed-signal front end 320 is configured to convert the composite digital RF signal into the outgoing analog RF signal over the same transmit path. In other aspects, the combination of the outgoing digital RF signals is performed outside of the mixed-signal front end 320 such that the mixed-signal front end 320 receives the composite digital RF signal as input. In one or more implementations, the composite digital RF signal is processed (e.g., is adjusted) first based on a loading voltage or a loading value before the composite digital RF signal (i.e., the processed composite digital RF signal) is converted into the outgoing analog RF signal by the mixed-signal front end 320 (e.g., the DAC 324), as described below. The loading voltage or the loading value may be determined based on the composite digital RF signal.

The mixed-signal front end 320 includes a digital-to-analog converter (DAC) configured to convert the composite digital RF signal into the outgoing analog RF signal on the transmit path. The outgoing analog RF signal is then fed to the Transmit RF Output port via the variable gain attenuator 315, the power amplifier 316 and the coupler 317.

The mixed-signal front end 320 includes a feedback circuit configured to receive the composite digital RF signal as feedback and provide a DAC loading control signal on a feedback path to each of the digital transceiver units 330, 340). In one or more implementations, the feedback circuit includes the digital level detector 323 and the DAC loading controller 326. The input to the digital level detector 323 is fed from a node at the output of the summation circuit 380, where the node is also coupled to the input of the DAC 324 along the transmit path. The output of the digital level detector 323 feeds the input of the DAC loading controller 326. The output of the DAC loading controller 326 is fanned out to each digital transceiver unit (e.g., 330, 340), where the output from the DAC loading controller 326 feeds an input to each RF transmitter upconverter (e.g., 335, 345) of the associated digital transceiver unit over the feedback path.

The digital level detector 323 determines the loading value from the composite digital RF signal. In one or more implementations, the digital level detector 323 is configured to measure a loading voltage from the composite digital RF signal. In some aspects, the root-mean-square (RMS) of the loading voltage and/or the peak-to-peak value of the loading voltage are measured.

The digital level detector 323 may compare the loading voltage to a threshold (e.g., an amplitude threshold). In one respect, the threshold may represent the full-scale amplitude range of the DAC 324. The composite digital RF signal formed by summing the N channels (e.g., a channel for each of N digital transceiver units) is adjusted so that the composite digital RF signal does not cause the DAC 324 to over-range (i.e., the amplitude of the composite digital RF signal is within the full-scale amplitude range of the DAC 324). For example, the digital level detector 323 adjusts the loading voltage when the loading voltage amplitude exceeds the threshold (e.g., clipping condition) based on the comparison. In some aspects, the digital level detector 323 may adjust (e.g., scale) the loading voltage downward such that the new amplitude of the loading voltage is within the full-scale range of the DAC 324. The loading value from the digital level detector 323 may represent the adjusted (or scaled) loading voltage when it is determined that the loading voltage exceeds the threshold. On the other hand, the loading value may represent the loading voltage (unaltered by the digital level detector 323) when the loading voltage does not exceed the amplitude threshold. In this respect, the processing of the composite digital RF signal prior to being fed to the DAC 324 includes an adjustment to the loading voltage to bring the amplitude of the composite digital RF signal to within full-scale range for the DAC 324 to process correctly.

In one or more implementations, the DAC loading controller 326 receives the loading value from the digital level detector 323 as a first input, and receives relative band loading controls as a second input, as shown in FIG. 3. The relative band loading controls include digital words that control the amplitude of a signal. In some aspects, each of the relative band loading controls corresponds to a sub-band (or a particular band of interest). In one or more implementations, the baseband processing circuit 140 generates and provides the relative band loading controls to the DAC loading controller 326. The relative loading, or RMS level, for each channel (e.g., the channel or band of each digital transceiver unit) may be adjusted to achieve a proper signal-to-noise ratio (SNR) for the channel, as seen by a remote user terminal or terminals that receive the outgoing RF signal from the antenna element 110. In a system application, the loading level for each channel (or band) may be a function of the bandwidth of the outgoing RF signal for the channel as well as a range (or distance from a transmit antenna) of a user. The loading level also may be a function of any interference that may further attenuate the outgoing RF signal for that path such as foliage, rain, or any obstruction.

In another implementation, the DAC loading controller 326 may receive the loading value from the digital level detector 323 as a first input, and receive absolute band loading controls (instead of relative band loading controls) as a second input. In yet another implementation, the DAC loading controller 326 may receive the loading value from the digital level detector 323 as a first input, and receive a combination of relative band loading controls and absolute band loading controls as a second input. In one or more implementations, the absolute band loading controls include digital words that control the amplitude of a signal. The absolute band loading controls may be predetermined (or fixed for all bands). In one or more implementations, the baseband processing circuit 140 generates and provides the absolute band loading controls to the DAC loading controller 326. The absolute band loading controls may be generated based on a system application. For example, the baseband processing circuit 140 may set the absolute band loading control for a given channel based on the bandwidth of the signal for the channel, relative to the combined bandwidth of all the outgoing signals being transmitted. In another example, the baseband processing circuit 140 may set the absolute band loading control for a given channel (or band) to meet certain signal quality values at a user device on a far end of a data link, for each of N data links.

The DAC loading controller 326 generates DAC loading control signals based on the loading value and based on the relative band loading controls and/or absolute band loading controls. The DAC loading controller 326 supplies the DAC loading control signals to the RF transmitter upconverter circuit (e.g., 335, 345) of each digital transceiver unit (e.g., 330, 340). Each RF transmitter upconverter circuit (e.g., 335, 345) applies the corresponding DAC loading control signal to the outgoing digital RF signal for adjusting an amount of loading associated with the outgoing digital RF signal.

In an aspect, the feedback circuit (e.g., 326) is coupled to each digital transceiver unit (e.g., 330, 340) independently, and may provide the DAC loading control signals in parallel to the digital transceiver units. In this respect, there may be a dedicated channel from the DAC loading controller 326 to each digital transceiver unit. In another aspect, the feedback circuit (e.g., 326) is coupled to the digital transceiver units over a common feedback path, and may provide the DAC loading control signals in a serial fashion over the common feedback path to the digital transceiver units. In this respect, each of the digital transceiver units (or each RF transmitter upconverter) may decode one DAC loading control signal from the serialized transmission of the DAC loading control signals using an identifier (unique to the digital transceiver unit or the RF transmitter upconverter) encoded in the DAC loading control signal.

In one or more implementations, the composite digital RF signal may be processed (e.g., adjusted) using a signal adjustment circuit (not shown), instead of using the feedback circuit (e.g., 323, 326). In this example, the signal adjustment block may be located between the output of the summation circuit 380 and the input of the DAC 324 along the transmit path. In this respect, the signal adjustment circuit may be configured to measure the voltage level of the composite digital RF signal. The signal adjustment circuit may adjust the composite digital RF signal when the composite digital RF signal exceeds a threshold (e.g., the full-scale amplitude range of the DAC 324) and provide the adjusted (e.g., scaled down) composite digital RF signal to the DAC 324. On the other hand, when the composite digital RF signal does not exceed the threshold, the signal adjustment circuit does not adjust the level of the composite digital RF signal and provides the composite digital RF signal (without adjustment) to the DAC 324. It is also noted that the signal adjustment circuit may be implemented as part of the summation circuit 380 in some embodiments, or may be implemented as part of the DAC 324 in other embodiments. In one or more other implementations, the composite digital RF signal may be processed (e.g., adjusted) using the signal adjustment circuit (not shown) in combination with the feedback circuit (e.g., 323, 326). It is also noted that processing (e.g., adjusting) of the composite digital RF signal may be carried out using one or more other implementations.

In some aspects, the multi-band linearized digital transceiver circuit 300 includes a transmit sense function. In an aspect, the transmit sense function may be performed using a transmit sense subsystem. The transmit sense function may enable an output of the transmitter (at the output of the PA 316) to be sampled and digitally downconverted separately to allow comparison with an intended waveform (e.g., input baseband signal through the Transmit Data In port). An error term may then be detected and sent through the non-linear predistortion circuit 334. The closed loop created by this process may be utilized to reduce the error term (e.g., drive the error term to an acceptably low value depending on application).

The RF front end 310 also includes a feedback circuit that is configured to receive one of the outgoing analog RF signal as feedback or an external transmit sense RF input signal. For example, the transmit sense path (e.g., 318, 319) processes a transmit sense signal from either the Tx Sense RF Input port or from the output of the PA 316 via the coupler 317 depending on implementation. In some aspects, the RF switch module 318 may be utilized to select the feedback (e.g., a signal from the Tx Sense RF Input port or a signal from the coupler). In a first case, the RF switch module 318 may allow the RF signal from the coupler 317 to be coupled to the ADC 325 of the transmit sense path via the RF switch module 318. In a second case, the RF switch module 318 may allow the RF signal from the Tx Sense RF Input to be coupled to the ADC 325 of the transmit sense path via the RF switch module 318. The RF front end 310 then provides an analog Tx sense signal on a feedback path to the mixed-signal front end 320 based on the selected signal. The transmit sense signal then traverses the RF switch module 318 to the ADC 325 via the feedback driver 319. The ADC 325 may convert the transmit sense signal to the digital domain and provide the digital signal to the Tx Sense down-converter circuit of each digital transceiver unit (e.g., 336, 346). In an aspect, the digital signal may be processed by the transmit sense downconverter circuit (e.g., 336, 346) and the transmit error detection circuit (e.g., 337, 347). An output of the transmit error detection circuit may be provided to the nonlinear predistortion circuit (e.g., 334, 343). Thus, the transmit sense path may allow a closed-loop feedback of the outgoing analog RF signal.

In some aspects, the multi-band linearized digital transceiver circuit 300 powers down the transmit sense path or does not have the transmit sense path. In such cases, the Tx sense downconverter circuit (e.g., 336, 346) and the transmit error detection circuit (e.g., 337, 347) may be powered off or may not be present in these digital transceiver units. The Transmit Data In may be coupled directly to the nonlinear predistortion circuit (e.g., 334, 344). In some cases, the nonlinear predistortion circuit may utilize correction coefficients stored in a register. The register may be included as part of the multi-band linearized digital transceiver circuit 300 or otherwise accessible by the multi-band linearized digital transceiver circuit 300. In an aspect, the correction coefficients may be determined during calibration and/or testing of the multi-band linearized digital transceiver circuit 300, and may allow for feedforward correction. In some cases, the correction coefficients stored in the register may be adjustable. In an aspect, an external system may be utilized to receive RF signal output from the multi-band linearized digital transceiver circuit 300 and utilize the received RF signals to generate updated correction coefficients (e.g., on a periodic basis). In this regard, the external system may be utilized to provide remote feedback to the multi-band linearized digital transceiver circuit 300. In some cases, the multi-band linearized digital transceiver circuit 300 may utilize remote feedback (e.g., from an external system) as well as local feedback (e.g., from a local transmit sense path) to provide the correction coefficients.

In some aspects, it is noted that the various components may be fabricated on different integrated circuits (ICs) and/or using different technology (e.g., silicon, silicon-germanium). For example, with reference to FIG. 3, the amplifier blocks, RF switch, coupler, and/or clock generator circuit may be fabricated on a different IC(s) and/or using a different technology(ies) from the ADCs and DAC.

Figure 4:
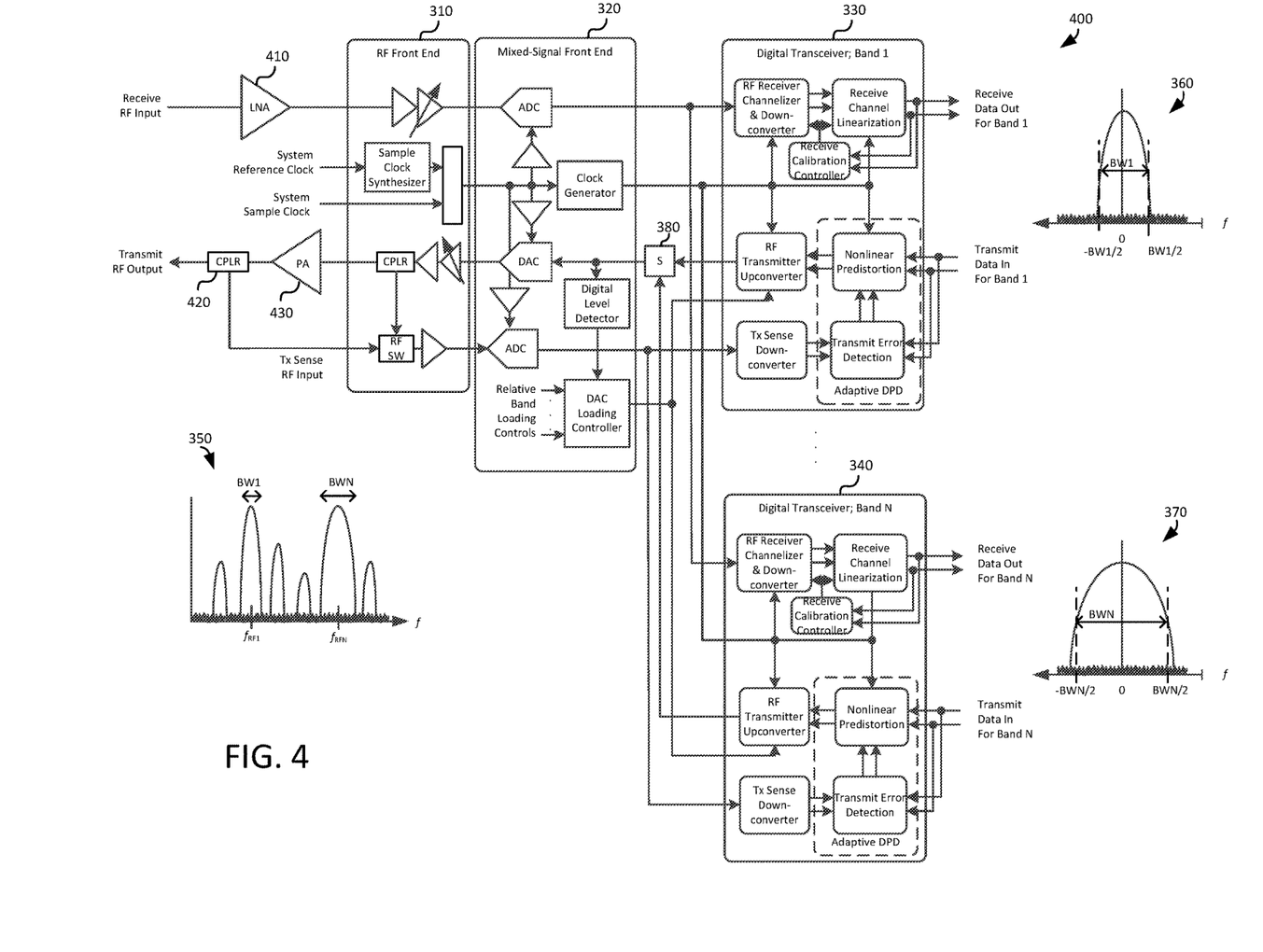
FIG. 4 illustrates another example of a multi-channel, multi-band linearized digital transceiver circuit.

FIG. 4 illustrates another example of a multi-band linearized digital transceiver circuit 400. The description of FIG. 3 generally applies to FIG. 4, with examples of differences between FIGS. 3 and 4 and other description provided herein for purposes of clarity and simplicity.

The multi-band linearized transceiver circuit 400 includes a LNA 410 on the receive path to the RF front end 310. The received signal from the antenna element 110 may be received at the RF front end 310 via the LNA 410. In this respect, the element directly coupled in series from the LNA 410 to the variable gain attenuator 314 may be an LNA or other type of high-linearity gain amplifier.

The multi-band linearized transceiver circuit 400 includes a PA 430 coupled in series with a coupler 420 (CPLR) on the transmit path from the RF front end 310. In some aspects, the coupler 420 may allow a portion of an RF signal to be provided to the Transmit RF Output and another (generally smaller) portion to be provided to the RF switch module 318. In an aspect, the Transmit RF Output may be coupled to the antenna element 110 of FIG. 2 (e.g., via the diplexer 115 and the PA 430). In such an aspect, the Tx Sense RF Input may be coupled to an output of the PA 430 (e.g., to allow feedback of the PA 430 output into the digital transceiver units). For example, the coupler 420 may be utilized to couple a portion of the PA 430 output to the diplexer 115 and another portion of the PA 430 output to the multiple digital transceiver units for different sub-bands (e.g., multi-band linearized transceiver circuit 400).

In FIGS. 3 and 4, the summation circuit 380 is shown as a separate block from the mixed-signal front end 320. In other examples, the summation circuit 380 may be implemented within the mixed-signal front end 320. In one or more aspects, having the summation circuit 380 within the mixed-signal front end 320 is equivalent to having the summation circuit 380 outside the mixed-signal front end 320.

Figure 5:
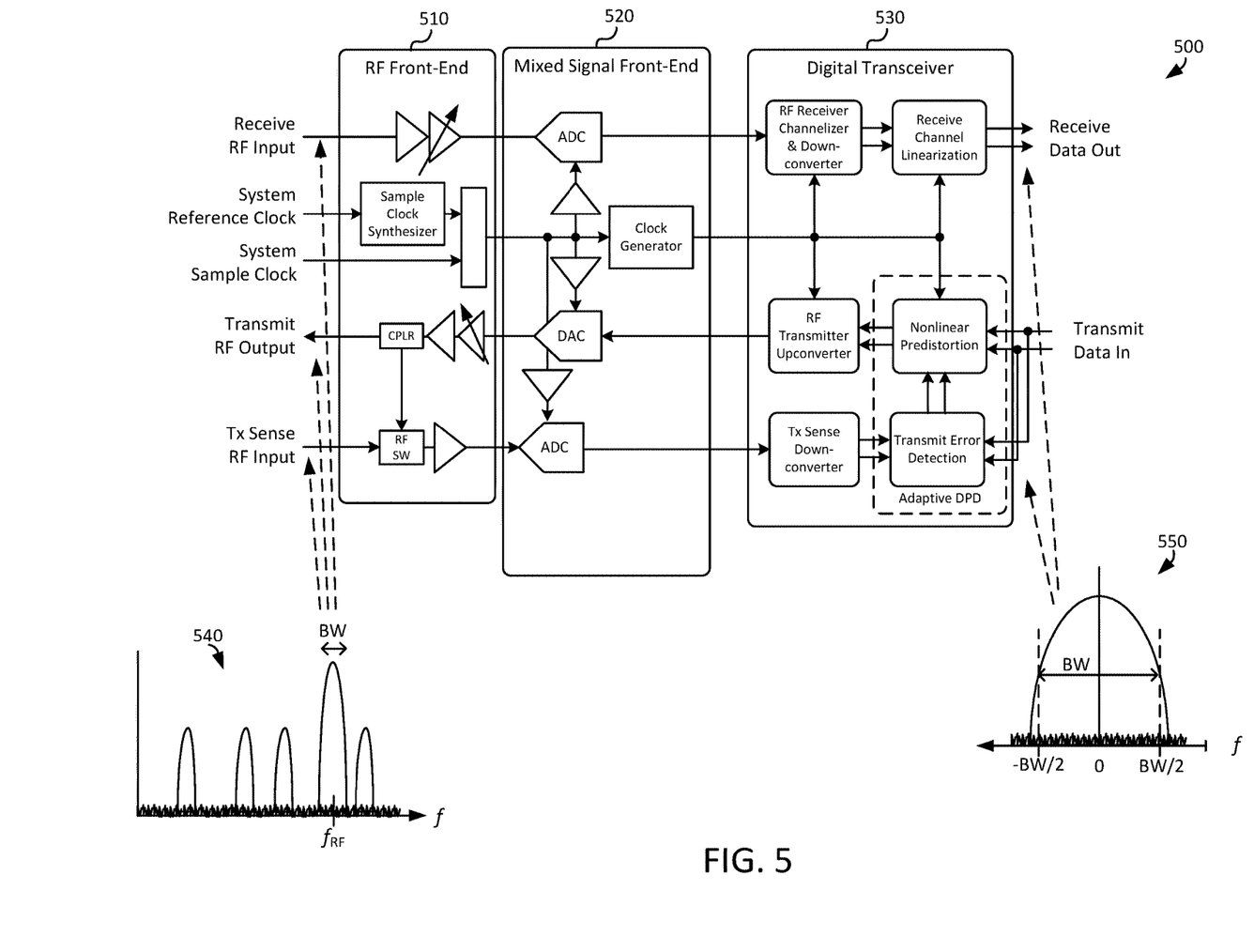
FIG. 5 illustrates an example of a single-channel digital transceiver circuit.

FIG. 5 illustrates an example of a single-channel digital transceiver circuit 500. The description of FIG. 3 generally applies to FIG. 5, with examples of differences between FIGS. 3 and 5 and other description provided herein for purposes of clarity and simplicity. The single-channel digital transceiver circuit 500 includes an RF front end 510, a mixed-signal front end 520, and a digital transceiver 530.

The single-channel digital transceiver circuit 500 may include a transmit path (e.g., radio frequency (RF) transmit path) and a receive path (e.g., RF receive path). In an aspect, an input and an output of the transmit path may be provided to the Transmit Data In port and the Transmit RF Output port, respectively. In an aspect, an input and an output of the receive path may be provided to the Receive RF input port and the Receive Data Out port, respectively. In an aspect, the single-channel digital transceiver circuit may be utilized to transmit RF signals and the receiver path may be utilized to receiver RF signals. As shown in FIG. 5, a signal 540, 550) of bandwidth BW may be received by and/or transmitted from the digital transceiver circuit.

In an aspect, the Receive RF Input port may be coupled to the antenna element 110 of FIG. 2 (e.g., via the diplexer 115 and the LNA 313). In an aspect, single-channel digital transceiver circuit 500 may be coupled to multiple antenna elements to facilitate beamforming. The Receive RF Input port may receive an incoming analog RF signal. The received RF signal may be amplified using one or more amplifiers (e.g., the variable gain attenuator 314). The amplified RF signal may be provided to the ADC 321 for conversion to the digital domain. The resulting digital signal may be provided to the digital transceiver backend (e.g., 330), where the resulting signal may be processed by the RF receiver channelizer and downconverter circuit (e.g., 331) and the receive channel linearization circuit (e.g., 332). An output of the receive channel linearization circuit (e.g., 332) may be coupled to the Receive Data Out port of the digital transceiver backend (e.g., 330). In an aspect, the Receive Data Out port may be coupled to the baseband processing circuit 140 of FIG. 2. The single-channel digital transceiver circuit 500 has a single digital transceiver 530 (not multiple digital transceivers) and does not include various components that are shown in FIG. 3 or 4 but not shown in FIG. 2.

Various examples of aspects of the disclosure are described below as clauses for convenience. These are provided as examples, and do not limit the subject technology.

Clause A. A method, comprising: processing a plurality of outgoing baseband processing signals, each of the plurality of outgoing baseband processing signals being associated with a sub-band of a plurality of baseband sub-bands; converting the plurality of outgoing baseband processing signals into a plurality of outgoing digital radio frequency (RF) signals; combining the plurality of outgoing digital RF signals into a composite digital RF signal; determining a loading value based on the composite digital RF signal; processing the composite digital RF signal based on the loading value; converting the processed composite digital RF signal into an outgoing analog RF signal; and providing, for transmission, the outgoing analog RF signal.

Clause B. A device for wireless communication, comprising: a radio frequency (RF) front end configured to receive an incoming analog RF signal associated with a receive path and configured to transmit an outgoing analog RF signal associated with a transmit path; a mixed-signal front end coupled to the RF front end, the mixed-signal front end configured to convert the incoming analog RF signal into an incoming digital RF signal; and a plurality of transceivers coupled to the mixed-signal front end, each of the plurality of transceivers configured to process the incoming digital RF signal to provide an incoming baseband processing signal associated with the receive path and configured to process an outgoing baseband processing signal to provide an outgoing digital RF signal associated with the transmit path, wherein the device is configured to: combine the plurality of outgoing digital RF signals from the plurality of transceivers into the composite outgoing digital RF signal; determine a loading value based on the composite outgoing digital RF signal; and process the composite outgoing digital RF signal based on the loading value, and wherein the mixed-signal front end is configured to convert the processed composite outgoing digital RF signal into the outgoing analog RF signal.

Clause C. An apparatus for wireless communication, the apparatus comprising: means for processing a plurality of outgoing baseband processing signals, each of the plurality of outgoing baseband processing signals being associated with a sub-band of a plurality of baseband sub-bands; means for converting the plurality of outgoing baseband processing signals into a plurality of outgoing digital radio frequency (RF) signals; means for combining the plurality of outgoing digital RF signals into a composite outgoing digital RF signal; means for determining a loading value based on the composite outgoing digital RF signal; means for processing the composite outgoing digital RF signal based on the loading value; means for converting the processed composite outgoing digital RF signal into an outgoing analog RF signal; and means for providing, for transmission, the outgoing analog RF signal. In one or more aspects, examples of additional clauses are described below.

A method comprising one or more methods, operations or portions thereof described herein.

An apparatus comprising means adapted for performing one or more methods, operations or portions thereof described herein.

A hardware apparatus comprising circuits configured to perform one or more methods, operations or portions thereof described herein.

An apparatus comprising means adapted for performing one or more methods, operations or portions thereof described herein.

An apparatus comprising components operable to carry out one or more methods, operations or portions thereof described herein.

In one aspect, a method may be an operation, an instruction, or a function and vice versa. In one aspect, a clause may be amended to include some or all of the words (e.g., instructions, operations, functions, or components) recited in other one or more clauses, one or more words, one or more sentences, one or more phrases, one or more paragraphs, and/or one or more claims. During prosecution, one or more claims may be amended to depend on one or more other claims, and one or more claims may be amended to delete one or more limitations.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

In one aspect, a transistor may be a bipolar junction transistor (BJT), and it may refer to any of a variety of multi-terminal transistors generally operating on the principal of carrying current using both electrons and holes, including but not limited to an n-p-n BJT and a p-n-p BJT.

In one aspect, a transistor may be a field effect transistor (FET), and it may refer to any of a variety of multi-terminal transistors generally operating on the principals of controlling an electric field to control the shape and hence the conductivity of a channel of one type of charge carrier in a semiconductor material, including, but not limited to a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

In one aspect, the terms base, emitter, and collector may refer to three terminals of a transistor and may refer to a base, an emitter and a collector of a bipolar junction transistor or may refer to a gate, a source, and a drain of a field effect transistor, respectively, and vice versa. In another aspect, the terms gate, source, and drain may refer to base, emitter, and collector of a transistor, respectively, and vice versa.

Unless otherwise mentioned, various configurations described in the present disclosure may be implemented on a Silicon, Silicon-Germanium (SiGe), Gallium Arsenide (GaAs), Indium Phosphide (InP) or Indium Gallium Phosphide (InGaP) substrate, or any other suitable substrate.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order.

In one aspect, a term coupled or the like may refer to being directly coupled. In another aspect, a term coupled or the like may refer to being indirectly coupled.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects. The circuits, blocks and sub-blocks shown may be arranged or partitioned differently. For example, the RF front end 310 and the mixed-signal front end 320 may be combined as a one block. One or more sub-blocks of the RF front end 310 and the mixed-signal front end 320 may be combined or separated out. The summation circuit 380 may be combined with the mixed-signal front end 320.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method, comprising:
processing an incoming radio frequency (RF) signal;
converting the incoming RF signal into an incoming baseband processing signal associated with a sub-band of a plurality of baseband sub-bands;
performing receiver signal calibration on the incoming baseband processing signal as feedback;
adjusting the incoming baseband processing signal based on die receiver signal calibration;
providing the adjusted incoming baseband processing signal for baseband processing;
processing a plurality of outgoing baseband processing signals, each of the plurality of outgoing baseband processing signals being associated with a sub-band of the plurality of baseband sub-bands;
converting the plurality of outgoing baseband processing signals into a plurality of outgoing digital RF signals;
combining the plurality of outgoing digital RF signals into a composite digital RF signal;
determining a loading value based on the composite digital RF signal;
processing the composite digital RF signal based on the loading value;
converting the processed composite digital RF signal into an outgoing analog RF signal; and
providing, for transmission, the outgoing analog RF signal.

2. The method of claim 1,
wherein determining the loading value comprises:
measuring a loading voltage from the composite digital RF signal;
comparing the loading voltage to a threshold; and
adjusting the loading voltage when the loading voltage exceeds the threshold based on the comparing,
wherein the loading value represents the adjusted loading voltage when the loading voltage exceeds the threshold, and the loading value represents the loading voltage when the loading voltage does not exceed the threshold.

3. The method of claim 1, wherein processing the composite digital RF signal comprises:
applying a set of loading control signals to the plurality of outgoing digital RF signals based on the loading value and band loading controls; and
adjusting an amount of loading associated with at least one of the plurality of outgoing digital RF signals using a corresponding loading control signal from the set of loading control signals.

4. The method of claim 1, further comprising:
receiving an incoming RF signal;
providing the incoming RF signal to a plurality of baseband receivers; and
performing receiver signal calibration at each of the plurality of baseband receivers independently.

5. The method of claim 4, further comprising:
converting the incoming RF signal into a plurality of incoming baseband processing signals, each of the plurality of incoming baseband processing signals being associated with a sub-band of the plurality of baseband sub-bands; and
performing linearization on one of the plurality of incoming baseband processing signals at a respective one of the plurality of baseband receivers, the receiver signal calibration at the respective one of the plurality of baseband receivers being performed using a respective linearized baseband processing signal.

6. A device for wireless communication, comprising:
a radio frequency (RF) front end configured to receive an incoming analog RF signal associated with a receive path and configured to transmit an outgoing analog RF signal associated with a transmit path;
a mixed-signal front end coupled to the RF front end, the mixed-signal front end configured to convert the incoming analog RF signal into an incoming digital RF signal; and
a plurality of transceivers coupled to the mixed-signal front end, each of the plurality of transceivers configured to process the incoming digital RF signal to provide an incoming baseband processing signal associated with the receive path and configured to process an outgoing baseband processing signal to provide an outgoing digital RF signal associated with the transmit path,
wherein the device is configured to:
combine the plurality of outgoing digital RF signals from the plurality of transceivers into a composite outgoing digital RF signal;
determine a loading value based on the composite outgoing digital RF signal; and
process the composite outgoing digital RF signal based on the loading value, and
wherein the mixed-signal front end is configured to convert the processed composite outgoing digital RF signal into the outgoing analog RF signal.

7. The device of claim 6, wherein the RF front end comprises:
a first variable gain attenuator;
a second variable gain attenuator;
a low-noise amplifier (LNA) coupled in series with the first variable gain attenuator associated with the receive path, the LNA configured to receive the incoming analog RF signal; and
a power amplifier (PA) coupled in series with the second variable gain attenuator associated with the transmit path, the PA configured to drive the outgoing analog RF signal.

8. The device of claim 7, wherein the RF front end comprises:
a sample clock synthesizer configured to:
receive a system reference clock and a system sample clock; select one of the system reference clock or the system sample clock based on a selection control signal; and
provide the selected one of the system reference clock or the system sample clock to the mixed-signal front end.

9. The device of claim 6, wherein the RF front end comprises:
a feedback circuit configured to:
receive, as feedback, the outgoing analog RF signal or an external transmitter sense RF input signal; and
provide an analog transmitter sense signal on a feedback path to the mixed-signal front end, based on the outgoing analog RF signal or the external transmitter sense RF input signal.

10. The device of claim 9, wherein the mixed-signal front end comprises:
a first analog-to-digital converter configured to convert the incoming analog RF signal into the incoming digital RF signal associated with the receive path: and
a second analog-to-digital converter configured to convert the analog transmitter sense signal into a digital transmitter sense signal on the feedback path.

11. The device of claim 6, wherein the mixed-signal front end comprises:
a digital-to-analog converter (DAC) configured to convert the processed composite outgoing digital RF signal into the outgoing analog RF signal associated with the transmit path; and
a feedback circuit configured to receive the composite outgoing digital RF signal as feedback and provide a DAC loading control signal on a feedback path to each of the plurality of transceivers.

12. The device of claim 11, wherein the feedback circuit is coupled to each of the plurality of transceivers independently and is further configured to provide the plurality of DAC loading control signals in parallel to the plurality of transceivers.

13. The device of claim 11, wherein the feedback circuit is coupled to the plurality of transceivers over a common feedback path and is further configured to provide the plurality of DAC loading control signals in series over the common feedback path to the plurality of transceivers, and wherein each of the plurality of transceivers is configured to decode one DAC loading control signal from the plurality of DAC loading control signals.

14. The device of claim 6, wherein the mixed-signal front end comprises:
a digital level detector configured to:
measure a loading voltage from the composite outgoing digital RF signal;
compare the loading voltage to a threshold;
adjust the loading voltage when the loading voltage exceeds the threshold based on the comparison; and
provide the loading value, wherein when the loading voltage exceeds the threshold, the loading value represents the adjusted loading voltage, and wherein when the loading voltage does not exceed the threshold, the loading value represents the measured loading voltage; and
a digital-to-analog converter (DAC) loading controller coupled to the digital level detector and configured to:
receive the loading value from the digital level detector;
receive one or more band loading controls, each of the one or more band loading controls corresponding to a sub-band of a plurality of baseband sub-bands; and
generate a plurality of DAC loading control signals based on the one or more band loading controls and the loading value, and
wherein the device is configured to apply the plurality of DAC loading control signals to the plurality of outgoing digital RF signals for adjusting an amount of loading associated with each outgoing digital RF signal.

15. The device of claim 6, wherein each of the plurality of transceivers is further configured to perform receiver signal calibration on the incoming baseband processing signal as feedback and configured to adjust the incoming baseband processing signal based on the receiver signal calibration.

16. An apparatus for wireless communication, the apparatus comprising:
means for processing a plurality of outgoing baseband processing signals, each of the plurality of outgoing baseband processing signals being associated with a sub-band of a plurality of baseband sub-bands;
means for converting the plurality of outgoing baseband processing signals into a plurality of outgoing digital radio frequency (RF) signals;
means for combining the plurality of outgoing digital RF signals into a composite outgoing digital RF signal;
means for determining a loading value based on the composite outgoing digital RF signal;
means for processing the composite outgoing digital RF signal based on the loading value;
means for converting the processed composite outgoing digital RF signal into an outgoing analog RF signal; and
means for providing, for transmission, the outgoing analog RF signal,
wherein the means for determining the loading value comprises:
means for measuring a loading voltage from the composite outgoing digital RF signal:
means for comparing the loading voltage to a threshold; and
means for adjusting the loading voltage when the loading voltage exceeds the threshold based on the comparing, and
wherein the loading value represents the adjusted loading voltage when the loading voltage exceeds the threshold, and the loading value represents the loading voltage when the loading voltage does not exceed the threshold.

17. The apparatus of claim 16, further comprising:
means for processing an incoming RF signal;
means for converting the incoming RF signal into an incoming baseband processing signal associated with a sub-band of the plurality of baseband sub-bands;
means for performing receiver signal calibration on the incoming baseband processing signal as feedback;
means for adjusting the incoming baseband processing signal based on the receiver signal calibration; and
means for providing the adjusted incoming baseband processing signal for baseband processing.

18. The apparatus of claim 17, further comprising:
means for providing the incoming RF signal to a plurality of baseband receivers;
means for converting the incoming RF signal into a plurality of incoming baseband processing signals, each of the plurality of incoming baseband processing signals being associated with a sub-band of the plurality of baseband sub-bands; and means for performing linearization on one of the plurality of incoming baseband processing signals at a respective one of the plurality of baseband receivers independently, the receiver signal calibration at a respective one of the plurality of baseband receivers being performed using a respective linearized baseband processing signal.

\* \* \* \* \*